(12) United States Patent
Gladney et al.

(10) Patent No.: US 9,642,472 B2
(45) Date of Patent: May 9, 2017

(54) METHOD OF MANUFACTURING AN AGED MATTRESS ASSEMBLY

(75) Inventors: Richard F. Gladney, Fairburn, GA (US); Michael S. DeFranks, Decatur, GA (US); Ronald M. Herrington, Brazoria, TX (US); Hui Yang, Duluth, GA (US); Rahul Kirtikar, Atlanta, GA (US)

(73) Assignee: DREAMWELL, LTD, Las Vegas, NV (US)

( * ) Notice: Subject to any disclaimer, the term of this patent is extended or adjusted under 35 U.S.C. 154(b) by 0 days.

(21) Appl. No.: 12/732,876

(22) Filed: Mar. 26, 2010

(65) Prior Publication Data
US 2010/0180416 A1    Jul. 22, 2010

Related U.S. Application Data

(62) Division of application No. 12/466,155, filed on May 14, 2009, now Pat. No. 7,690,096.
(Continued)

(51) Int. Cl.
*A47C 31/12*    (2006.01)
*A47C 27/14*    (2006.01)
(Continued)

(52) U.S. Cl.
CPC .......... *A47C 31/123* (2013.01); *A47C 27/148* (2013.01); *A47C 27/15* (2013.01);
(Continued)

(58) Field of Classification Search
CPC . B29C 44/5636; B29C 44/5627; B29C 47/34; B29C 47/0019; B20B 9/24; B68G 7/00
(Continued)

(56) References Cited

U.S. PATENT DOCUMENTS 2,740,157 A  *  4/1956  De Long et al. ............... 264/53
3,240,846 A  *  3/1966  Voelker ........................ 264/46.2
(Continued)

FOREIGN PATENT DOCUMENTS

CN    1089460 A    7/1994
DE    3402749 A1   8/1984
(Continued)

OTHER PUBLICATIONS

Partial International Search Report dated Dec. 21, 2009 for PCT/US2009/057645.
(Continued)

*Primary Examiner* — Jacob Cigna
(74) *Attorney, Agent, or Firm* — Cantor Colburn LLP

(57) ABSTRACT

Mattresses and methods for processing a flexible foam material for use in a mattress to provide a mattress foam material that has more consistent firmness over time and area. The methods include pre-conditioning the foam pad or mattress by applying a force across a substantial portion of a major surface of the mattress to compress or stretch the height of the foam, the length of the foam, and/or the width of the foam to break or open closed cells. In certain embodiments, the force is applied by repeatedly pressing a platen against the foam pad or placing the foam pad between one or more rollers.

9 Claims, 14 Drawing Sheets

Related U.S. Application Data

(60) Provisional application No. 61/192,575, filed on Sep. 19, 2008, provisional application No. 61/204,727, filed on Jan. 9, 2009.

(51) Int. Cl.
*A47C 27/15* (2006.01)
*B29C 44/56* (2006.01)
*B68G 7/00* (2006.01)
*B29K 275/00* (2006.01)
*B29L 31/58* (2006.01)
*B29L 31/00* (2006.01)

(52) U.S. Cl.
CPC ............ *B29C 44/5627* (2013.01); *B68G 7/00* (2013.01); *B29K 2275/00* (2013.01); *B29L 2031/58* (2013.01); *B29L 2031/751* (2013.01); *Y10T 29/48* (2015.01); *Y10T 29/49826* (2015.01); *Y10T 29/49863* (2015.01)

(58) Field of Classification Search
USPC .............................. 492/15; 521/918; 425/445
See application file for complete search history.

(56) References Cited

U.S. PATENT DOCUMENTS

| | | | |
|---|---|---|---|
| 3,274,924 A * | 9/1966 | Walker | 100/153 |
| 3,443,007 A * | 5/1969 | Hardy | 264/321 |
| 3,459,122 A * | 8/1969 | Saller et al. | 100/118 |
| 3,501,345 A * | 3/1970 | Kaether et al. | 127/5 |
| 3,506,600 A * | 4/1970 | Zocco | 521/128 |
| 3,816,233 A * | 6/1974 | Powers | 428/213 |
| 3,894,486 A * | 7/1975 | Sparowitz et al. | 100/118 |
| 4,042,986 A | 8/1977 | Goodman et al. | |
| 4,201,818 A * | 5/1980 | Rohn | 428/159 |
| 4,228,076 A * | 10/1980 | Pettingell | 264/321 |
| 4,334,944 A * | 6/1982 | Creyf | C08G 18/14 156/308.2 |
| 4,338,072 A * | 7/1982 | Milford et al. | 425/371 |
| 4,344,902 A | 8/1982 | Milford et al. | |
| 4,395,214 A * | 7/1983 | Phipps et al. | 425/214 |
| 4,700,447 A | 10/1987 | Spann | |
| 4,967,433 A | 11/1990 | Neal | |
| 5,038,433 A | 8/1991 | Farley | |
| 5,138,730 A | 8/1992 | Masuda | |
| 5,172,436 A | 12/1992 | Masuda | |
| 5,859,076 A * | 1/1999 | Kozma et al. | 521/79 |
| 6,050,964 A | 4/2000 | Yates | |
| 6,083,337 A | 7/2000 | Bailey et al. | |
| 7,293,311 B2 | 11/2007 | Baker | |
| 7,690,096 B1 | 4/2010 | Gladney et al. | |
| 2001/0029632 A1 | 10/2001 | Parvin | |
| 2003/0009831 A1 | 1/2003 | Giori et al. | |
| 2008/0086984 A1 | 4/2008 | Andria et al. | |
| 2010/0180416 A1 | 7/2010 | Gladney et al. | |

FOREIGN PATENT DOCUMENTS

| | | |
|---|---|---|
| DE | 3402749 A1 | 8/1984 |
| EP | 0393255 A1 | 10/1990 |
| EP | 0393255 A1 | 10/1990 |
| EP | 0480029 A1 | 4/1992 |
| EP | 2337477 A2 | 6/2011 |
| FR | 2692834 A1 | 12/1993 |
| FR | 2692834 A1 | 12/1993 |
| GB | 2215658 A | 9/1989 |
| GB | 2215658 A | 9/1989 |
| GB | 2339199 A | 1/2000 |
| GB | 2339199 A | 1/2000 |
| WO | 8908547 A1 | 9/1989 |
| WO | WO-8908547 | 9/1989 |
| WO | 2010033895 A2 | 3/2010 |

OTHER PUBLICATIONS

International Preliminary Report on Patentability issued in International Application No. PCT/US2009/057645, dated Mar. 22, 2011; 9 pages.
Office Action issued in New Zealand Patent Application No. 591899 dated Mar. 14, 2012; 2 pages.
Office Action and English Translation of Office Action issued in Chinese Patent Application No. 200980145306.3 dated Apr. 9, 2014; 6 pages.
Office Action and English Translation of Office Action issued in Chinese Patent Application No. 200980145306.3, dated Mar. 15, 2013; 16 pages.
Office Action issued in Chinese Patent Application No. 200980145306.3, issued Jun. 9, 2015; 16 pages including English Translation.
Examination Report issued in European Patent Application No. 09792763.6-1653, dated Jul. 25, 2014; 4 pages.
Office Action and English Translation of Text, issued in Chinese Patent Application No. 200980145306.3, dated Sep. 3, 2014; 21 pages.
English Translation of Office Action issued in Korean Patent Application No. 10-2011-7008910, dated Sep. 30, 2015; 2 pages.
Foam Compression Fixtures, Catalog Nos. 2810-097*, 2810-130, 2810-191, Instron Corporation, 2005, 2 pgs.
Office Action (and English Translation of Office Action), issued in Chinese Patent Application No. 200980145306.3, dated Dec. 16, 2015; 10 pages.
Office Action issued in Canadian Patent Application No. 2,737,749, dated Sep. 23, 2015; 3 pages.
Office Action issued in Argentine Patent Application No. P090103614, dated Apr. 11, 2016; 2 pages.
Office Action issued in Canadian Patent Application No. 2,737,749, dated Aug. 1, 2016; 3 pages.
Office Action issued in Chinese Patent Application No. 200980145306.3, dated May 30, 2016; 10 pages.
Office Action issued in Korean Patent Application No. 10-2011-7008910, dated Jun. 30, 2016; 5 pages.

* cited by examiner

METHOD OF MANUFACTURING AN AGED MATTRESS ASSEMBLY

CROSS-REFERENCE TO RELATED APPLICATIONS

The present application is a divisional application of U.S. patent application Ser. No. 12/466,155, filed on May 14, 2009, which claimed the benefit of the filing dates of U.S. Provisional Application No. 61/192,575, filed on Sep. 19, 2008, and U.S. Provisional Application No. 61/204,727, filed on Jan. 9, 2009. All of these applications are hereby incorporated herein by reference in their entirety.

FIELD OF THE INVENTION

This invention generally relates to cushioning articles such as mattresses and methods for processing a flexible foam material for use in a cushioning article so that it has more consistent firmness over time and area.

BACKGROUND OF THE INVENTION

Today, furniture, and particularly bedding, manufacturers have developed sophisticated and reliable techniques for manufacturing high quality and durable mattresses. The industry is capable of providing mattresses that last for over ten years providing comfortable sleeping surfaces for all that time.

As the industry strives to continue providing improved quality and reliability, one area being addressed is the ability of the industry to provide a consistent consumer experience across the lifetime of owning the mattress, from the point of selecting the mattress until the mattress is eventually replaced. When addressing the ability to provide a consistent consumer experience for the entire lifespan of the mattress, one engineering problem that needs to be addressed is the changing characteristics of flexible foam over time. In particular, it has been noticed by consumers that the mattress they select when testing mattresses on the showroom floor may have a firmness that differs, at least somewhat, from the firmness of the mattress that ultimately is delivered to their home after they purchase the mattress. Commonly, the consumer finds that the mattress delivered to their home is more firm than the mattress they tested on the showroom floor. Additionally, over time the firmness of the mattress may change. As the consumer uses the mattress, the mattress may develop areas where the mattress is less firm than in other areas. Thus, over time the sleeping surface(s) of the mattress can have an inconsistent feeling, one where the firmness of the mattress varies or is perceived to vary.

Mattress manufacturers have circumvented this problem by educating the consumer about the nature of foam and informing them that they should expect the firmness of their newly purchased mattress to change over time. However, this approach fails to address the underlying reasons for the phenomenon and does not provide the consumer with a reliable estimate about how much the firmness of their new mattress is likely to change.

Accordingly, there is a need in the art to provide for a mattress that provides a more consistent consumer experience yielding a firmness that is consistent over time and over the full area of the mattress.

SUMMARY OF THE INVENTION

It is a realization of the invention that improved manufacturing and finishing techniques can provide improved mattresses that have more consistent characteristics over time and area. Though not to be bound by theory, this realization arises in part from the study of the cell structure of foam. Foam is a cellular polymeric material. Polyurethane foam is typically made by introducing tiny expandable gas bubbles into a reacting mixture of a polyol, a polyisocyanate and other needed ingredients. As the reactions proceed, a polymer matrix is formed and the bubbles expand to give a cellular structure commonly called a foam.

The cellular structure is a network of interconnected cells made up of structural elements commonly called windows and struts. The interconnected cells in the foam structure have cell walls that have common openings or windows between them. Depending on manufacturing processes and the nature of the chemicals used, some of the cell windows will be open while others may be closed by a thin film of the polyurethane material. These closed cell windows can be broken or ruptured by repeatedly stressing the material through compression and/or stretching such as those during the regular daily use of a mattress. Hence, a new or unaged mattress may have more closed cell windows than a used, aged mattress.

The cell structure thus formed can play an important role in determining the mechanical properties of the foam including its firmness or hardness. Hardness or firmness is typically measured by an indentation force deflection test (IFD), which is a measurement of the load bearing properties of the foam. In this test, a circular plate is depressed into the foam to a desired depth or indentation. The test determines the force required to reach a specified indentation. Alternatively, the circular plate is depressed on a foam pad and applies a specified force. The indentation on the foam pad resulting from the force is measured. However, air may be trapped within the closed cells, and air flow through the foam may be limited if there is a large number of closed or only partially open cells. Consequently, during IFD tests, additional force may be required to force the air out of the foam and the closed cells thereby generating an artificially high hardness or firmness measurement that may change through normal use. If the same foam is then tested again, and again, the hardness is likely to go down a little bit on each successive test cycle because the cell windows in the foam are getting blown open or ruptured allowing air to pass through the foam more freely. Therefore, the IFD test measurements may effectively reflect the temporary pneumatic characteristics of these air-filled closed cells rather than the eventual firmness of the used, aged foam when the cell windows have been broken through regular use.

Generally, foams used in automotive seating applications tend to be molded foams designed to have a large population of closed cells when demolded. If these cell windows are not crushed open immediately, the foam pad is likely to lose dimensions and shrink. This is because carbon dioxide gas gets trapped in the closed cells, cools down once the foam is demolded and then diffuses out from the cells faster than air diffusing into the cells. Therefore, a pressure differential is generated between the outside and the inside of the cells causing the foam to shrink. To reduce foam shrinkage, molded foam pads intended for automobile seats are passed through rollers immediately after demolding to drive out trapped hot gases such as carbon dioxide and thereby prevent foam shrinkage. However, foams used in mattresses or cushions are not generally not made by such a molding process and consequently are not commonly thought to have carbon dioxide trapped in closed cells. Therefore, foam and mattress manufacturers have not thought to pass foam mattresses or cushioning foam pads through rollers for pre-conditioning and stabilizing firmness.

As noted earlier, cell windows may be ruptured by repeatedly stressing the material by compressing it and/or stretching it. Although compression of a mattress or foam pad will rupture some of the cell windows present in the foam, compression techniques adapted for use with mattresses or foam pads typically will only compress a mattress or pad in one direction. For most mattresses and pads, this compression generally will be in the direction of the smallest dimension, e.g. the height of a typical mattress in a typical sleeping configuration. In order to increase the extent of cell window rupture, a mattress or foam pad may be stressed along a plurality of physical axes, for example along as many of the three physical axes as possible. The aspect ratios (ratio of two physical dimensions, such as width to height, width to length, or height to length) of typical mattresses and foam pads make roller-based compression in the length and width directions difficult due to buckling in the height direction. However, the very same aspect ratio makes roller-based stretching in the length and width directions possible. The system and methods described herein include compression or stretching techniques, or a combination of both techniques to pre-condition or pre-stress mattresses or cushioning foam pads.

The systems and methods described herein include methods for manufacturing and finishing a mattress. The methods include pre-conditioning or accelerating the aging of the new, unaged foam pad or mattress by applying a force across a substantial portion of a major surface of the mattress to temporarily compress the height of the foam and break or open closed cells. In certain embodiments, the force is applied by repeatedly pressing a platen against the mattress or foam pad. Alternatively, the force may be applied by passing the foam pad or mattress under at least one roller or through at least one complementary pair of rollers. The methods also include pre-conditioning the foam pad or mattress by applying a force to stretch the length and/or width of the foam pad or mattress to break or open closed cells. The systems and methods described herein overcome various limitations of current methods by generating mattresses and cushioning articles having a firmness that is substantially consistent over time and multiple uses and different from the firmness of new, unaged mattresses and cushioning articles.

Accordingly, in one aspect, the invention provides methods of finishing and providing a mattress to a user that comprise providing an unaged mattress assembly having a first foam pad with an initial height and a mattress core, accelerating the aging of the unaged mattress assembly by applying a force to at least a section of the mattress assembly sufficient to temporarily compress its height an amount selected to permanently alter a mechanical property of the foam pad representative of indentation force deflection, disposing the foam pad over the mattress core to provide at least a portion of a sleeping surface over the mattress core, and providing an aged mattress assembly having a firmness that is different from the firmness of the unaged mattress assembly. Optionally, the unaged mattress assembly further comprises a second foam pad with an initial height, and stressing the unaged mattress assembly further comprises applying a force to at least a section of the second foam pad sufficient to compress the height of the second foam pad an amount selected to alter a mechanical property of the second foam pad, and disposing the second foam pad over the mattress core. In certain embodiments, stressing the unaged mattress assembly comprises applying a force to the mattress assembly sufficient to compress the heights of one or more foam pads in the assembly an amount selected to alter one or more mechanical properties of the one or more foam pads after the foam pads have been disposed over the mattress core.

In another aspect, the invention provides methods of manufacturing a mattress that comprise providing a foam pad having an initial height, pre-conditioning the foam pad by applying a force to a least a section of the foam pad sufficient to temporarily compress the height of the foam pad an amount selected to permanently alter a mechanical property of the foam pad, wherein the mechanical property may be representative of the hardness or indentation force deflection. In certain embodiments, the foam pad may also be pre-conditioned by applying a force to at least a section of the foam pad sufficient to stretch the length and/or width of the foam pad by an amount selected to alter a mechanical property of the foam pad, wherein the mechanical property may be representative of the hardness or indentation force deflection. In another step, the foam pad is disposed over the mattress core to provide at least a portion of the sleeping surface over that mattress core. In certain embodiments, the foam pad may be pre-conditioned by applying a force to at least a section of the foam pad sufficient to open the closed cells.

Optionally, the method may include pre-conditioning at least a second foam pad by applying a force to at least a section of the second foam pad that is sufficient to compress the height of the foam pad and/or stretch the length and/or width of the foam pad by an amount selected to alter a mechanical property of that second foam pad. The second foam pad may also be disposed over the mattress core to provide a mattress having a sleeping surface with multiple layers of pre-conditioned foam including two, three, four, or greater layers, with the number of layers selected to suit the application.

In another aspect, the systems and methods described herein will be understood to include a mattress having a pre-conditioned sleeping surface. The mattress comprises a mattress core having a length, a width and a thickness and at least one sleeping side, and a layer of foam having a length and a width substantially similar to the length and the width of the mattress core. The foam, once pre-conditioned in accordance with an embodiment of the invention, also has a cell structure with cells having many ruptured windows being distributed substantially uniformly across its length, its width, and its thickness and the layer of foam is disposed over the sleeping side of the mattress core to provide a sleeping surface of the mattress having a substantially consistent firmness across the sleeping surface. Many cell windows may be ruptured so as to increase the airflow through the foam pad and/or to reduce the pneumatic contribution to the foam pad's hardness or firmness. Moreover, because many cell windows are already broken when the customer purchases the aged mattress assembly through the inventive process described herein, further cell window rupturing due to the customer's use will be minimal and the customer will notice that the firmness of the foam pad will not change significantly over time and use, especially as compared with the firmness of an unaged mattress assembly with a majority of unbroken cell windows.

In one embodiment, the layer of foam comprises open cells resultant from application of forces wherein each cell includes at least one cell window defining an interior cellular cavity and having at least one opening sufficient to allow air to flow into and out of the interior cellular cavity.

In another aspect, the invention provides methods of manufacturing a mattress that comprise providing a foam pad having an initial length and width, pre-conditioning the foam pad by applying a force to a least a section of the foam pad sufficient to stretch at least one of the length and width of the foam pad an amount selected to alter a mechanical property of the foam pad, wherein the mechanical property may be representative of the hardness or indentation force deflection. In another step, the foam pad is disposed over the mattress core to provide at least a portion of the sleeping surface over that mattress core. In certain embodiments, the foam pad may be pre-conditioned by applying a force to at least a section of the foam pad sufficient to open the closed cells. Optionally, the foam pad may be pre-conditioned by applying a first force to a first section of the foam pad sufficient to compress the height of the first section a first amount selected to alter a mechanical property of the foam pad and by applying a second force to a second section of the foam pad sufficient to compress the height of the second section a second amount selected to alter a mechanical property of the foam pad.

Optionally, the method may include pre-conditioning at least a second foam pad by applying a force to at least a section of the second foam pad that is sufficient to stretch at least one of the length and width of the foam pad by an amount selected to alter a mechanical property of that second foam pad. The second foam pad may also be disposed over the mattress core to provide a mattress having a sleeping surface with multiple layers of pre-conditioned foam including two, three, four, or greater layers, with the number of layers selected to suit the application.

In another aspect, the invention provides methods of manufacturing a cushioning article that comprise providing a foam pad having an initial length and width, pre-conditioning the foam pad by applying a force to a least a section of the foam pad sufficient to stretch at least one of the length and width of the foam pad an amount selected to alter a mechanical property of the foam pad, wherein the mechanical property may be representative of the hardness or indentation force deflection. In certain embodiments, the foam pad may be pre-conditioned by applying a force to at least a section of the foam pad sufficient to open the closed cells. Optionally, the method may include disposing at least one second foam pad over the first foam pad to provide a cushioning article with multiple layers of foam. In certain embodiments, the at least one second foam pad may be pre-conditioning by applying a force to at least a section of the second foam pad that is sufficient to stretch at least one of the length and width of the foam pad by an amount selected to alter a mechanical property of that second foam pad.

In all of the above aspects and embodiments, applying the force may be achieved by applying a deflecting, compressing, and/or stretching mechanical force to the foam pad in one or more dimensions or applying an increased gas pressure to the foam pad or by vacuum crushing the foam pad. For example, in one embodiment, a roller or an indenting foot may be used for applying a compressing mechanical force, and one or more rollers may be used to apply a stretching mechanical force. In another embodiment, the mattress or foam pad may pass through at least two pairs of counter rotating rollers, oriented parallel to each other and perpendicular to the passing direction of the mattress or foam pad. In this embodiment, the second pair of rollers has a higher tangential velocity than the first pair of rollers, which may result in the application of a stretching mechanical force. Optionally, the at least two pairs of rollers may be oriented parallel to each other and parallel to the passing direction of the mattress or foam pad. In this embodiment, the rollers rotate at the same tangential velocity but in opposite directions, acting to pull in opposite directions. The foam pad being operated on may be any suitable foam pad, such as a flexible foam pad, and may comprise a polyurethane foam, a visco-elastic foam, a latex foam, a reticulated foam, water blown foam, polyethylene foam, a fiber pad, a gel or combination of any of these cushioning materials.

Applying the force can take place by pressing a platen against the surface of the foam pad as well as by applying a roller that moves across the surface of the foam pad or that uses at least one pair of counter-rotating rollers or with a belt or roller conveyor to provide the force. The force may be applied once or may be provided in a series of incremental steps that optionally may be periodic. In certain embodiments, each foam pad may be pressed and/or stretched separately or a group of foam pads may be pressed and/or stretched simultaneously. The group of foam pads may be stacked on top of each other and then pre-conditioned or pressed. In certain embodiments the foam pads may be processed or pre-conditioned in batches. In other embodiments, the foam pads may be processed continuously as part of an assembly line.

In another aspect, the invention provides systems for pre-conditioning cushioning articles that comprise at least a first pair of rollers, a first and second support frame, and a hinge system having at least one support spring. The at least one first pair of rollers includes a first roller and a second roller, separated from each other by a first gap. The first roller is rotationally coupled to the first support frame and the second roller is rotationally coupled to the second support frame. In certain embodiments, at least one of the first roller and second roller is rotationally coupled to its respective support frame with at least one freely rotating coupling. Optionally, at least one of the first roller and second roller is rotationally coupled to its respective support frame via at least one roller driver coupling. In this embodiment, at least one of the first roller and second roller may be rotationally coupled to and actuatable by a motor assembly. In certain embodiments, the pre-conditioning system further comprises a plurality of rollers including a second pair of rollers and a third pair of rollers, wherein the first, second, and third pairs of rollers are arranged in a series configuration and have degrees of freedom in both the vertical and machine direction regarding set points.

In certain embodiments, the first pair of rollers includes a first top roller and a first bottom roller, separated from each other by a gap of about 2 inches. The second pair of rollers includes a second top roller and a second bottom roller, separated from each other by a gap of about 1 inch, and the third pair of rollers includes a third top roller and a third bottom roller, separated from each other by a cap of about 0.5 inch. The first, second, and third top rollers are coupled to a top support frame, and the first, second, and third bottom rollers are coupled to a bottom support frame.

In certain embodiments, the first or top support frame and the second or bottom support frame is coupled to each other by an adjustable hinge system. This adjustable hinge system includes at least one support spring attached to the second or bottom support frame, and is configured to exert a force on the second or top support frame sufficient to maintain the first gap between the at least one first pair of rollers or the spacing between the respective top and bottom rollers. Optionally, the first gap or spacing between gaps change in response to adjustments in the hinge system.

BRIEF DESCRIPTION OF THE FIGURES

The foregoing and other objects and advantages of the invention will be appreciated more fully from the following further description thereof, with reference to the accompanying drawings wherein.

DETAILED DESCRIPTION OF THE ILLUSTRATED EMBODIMENTS

The systems and methods described herein include, among other things, systems and methods for processing and finishing a foam material for use in a mattress to provide a mattress foam material that has more consistent hardness over time and area. Although the systems and methods described herein are described with reference to use with a mattress or sleeping surface, it will be understood by those of skill in the art that the foam processing techniques and systems described herein may be applied in other applications including other furniture related applications for sofas, chairs, love seats, boat seats, and other applications.

Figure 1:
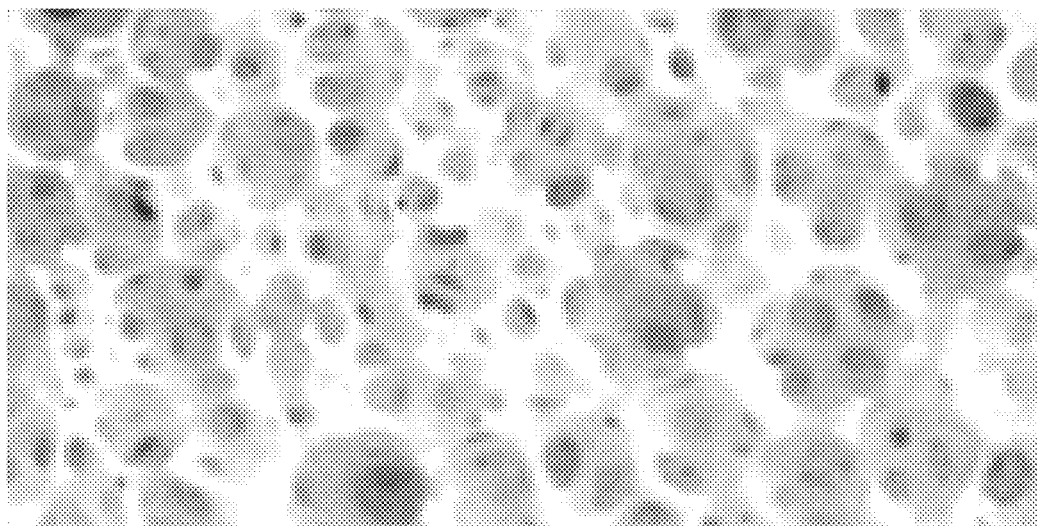
FIG. 1 is a photomicrograph of an open cell foam.

Turning to FIG. 1, there is depicted a photomicrograph of an open-cell foam material. Foam material may include polyurethane foam manufactured from synthetic or natural raw materials or latex foam material. Polyurethane foam is typically made by introducing tiny expandable gas bubbles into a reacting mixture of a polyol, a polyisocyanate and other needed ingredients. As the reactions proceed, a polymer matrix is formed and the bubbles expand to give a cellular structure commonly called a foam.

The cellular structure, as shown in FIG. 1, is a network of interconnected cells of the foam material (e.g., polyurethane) made up of structural elements commonly called windows and struts. The interconnected cells in the foam structure have cell walls that have common openings or windows between them. Depending on manufacturing processes and the nature of the chemicals used, some of the cell windows will be open while others may be closed by a thin film of the polyurethane material. These closed cell windows can be broken or ruptured by repeated compressions such as those during the regular daily use of a mattress. Furthermore, these closed cell windows may also be broken by stretching of the foam structure.

As noted earlier, the cell structure thus formed can play an important role in determining the mechanical properties of the foam including its firmness or hardness. In particular, because of the temporary pneumatic characteristics of air-filled closed cells, foam may be harder initially, but become softer after repeated use and after these cell windows have been broken through regular use and aging.

Not to be bound by theory, but an understanding of the manufacturing process as set forth above illustrates that when first manufactured, the cells formed within the foam material have cell windows that are relatively frail and subject to rupture upon application of stress. It is understood that the rupture of these windows results in an increase in airflow through the polymer foam and therefore a change in the pneumatic characteristics of the cells within the foam. This can impact the overall firmness of the foam. Thus, distributed throughout the foam material are cell windows that will rupture upon application of sufficient stress to cause the windows to fail. As will be described in greater detail hereinafter, the systems and methods described herein provide techniques for conditioning a foam pad and accelerating its aging to rupture weak cell windows, thereby affecting the hardness of the foam pad such that later use will not result in a change, or a substantial change, in the firmness of the pad. By preconditioning a mattress pad across its length, width, and/or thickness it is understood that a consistent firmness for the pad may be provided across the full area of the foam pad. Generally, in the embodiments described herein, processes involved in conditioning, pre-conditioning, stressing, pre-stressing, and aging are similar, and may involve compression and/or stretching once or multiple times.

In one set of experimental data, the results of which are set forth in Table 1, a hexagonal roller test was applied to a foam pad that has not been prestressed to determine the effect of periodic and reciprocating mechanical stress to the load deflection of the foam pad. In particular, in the data set forth in Table 1, a foam pad for a mattress was subjected to a modified 100,000 cycles of a hexagonal roller procedure per ASTM F1566-99 Part 7 standard. The load deflection measurements were obtained in accordance with ASTM F1566-99 Part 6 (center position) prior to testing, after 1,000 cycles and after 100,000 cycles. This was accomplished with a 13.5" diameter circular platen. Height measurements were gauged by applying a one pound contact force to the mattress surface with the 13.5" circular platen. The mattress was allowed to recover for one hour prior to height and deflection measurements.

TABLE 1

HEXAGONAL ROLLER TEST RESULTS: 100,000 CYCLE TEST

| Deflection, inches | Load (lbs) Initially | Load (lbs) 1000 cycles | % Change (0-1000 cycles) | Load (lbs) 100,000 cycles | % Change 0-100,000 cycles) | % Change (1000-100,000 cyc) |
|---|---|---|---|---|---|---|
| 0.5" | 19.2 | 21.8 | 13.5 | 21.5 | 12.0 | −1.4 |
| 1.0" | 44.6 | 35.2 | −21.1 | 30.9 | −30.7 | −12.2 |
| 1.5" | 57.7 | 48.2 | −16.5 | 44.4 | −23.1 | −7.9 |

TABLE 1-continued

HEXAGONAL ROLLER TEST RESULTS: 100,000 CYCLE TEST

| Deflection, inches | Load (lbs) Initially | Load (lbs) 1000 cycles | % Change (0-1000 cycles) | Load (lbs) 100,000 cycles | % Change 0-100,000 cycles) | % Change (1000-100,000 cyc) |
|---|---|---|---|---|---|---|
| 2.0" | 75.2 | 65.7 | −12.6 | 61.3 | −18.5 | −6.7 |
| 2.5" | 93.3 | 83.6 | −10.4 | 78.7 | −15.6 | −5.9 |
| 3.0" | 112 | 102.4 | −8.6 | 97.4 | −13.0 | −4.9 |
| Average | | | −11.2 | | −16.9 | −6.4 |
| Height @ 1 lb | 10.95 | 10.65 | −0.30 | 10.51 | −0.45 | −0.14 |

Figure 2:
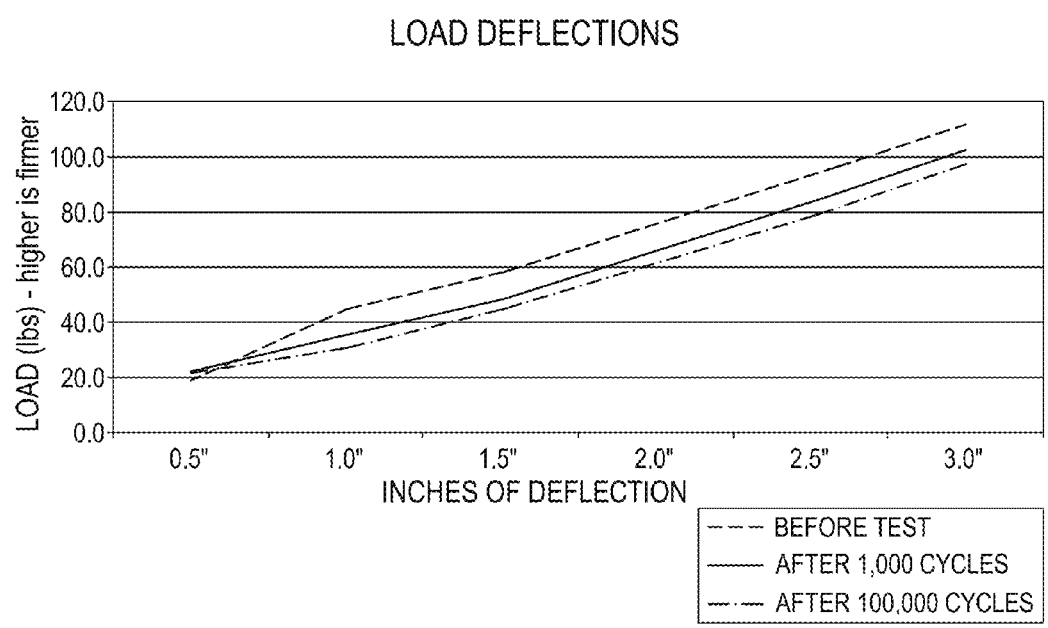
FIG. 2 graphically depicts the changes in load deflections of a material being processed as being described herein.

As shown in Table 1, and as presented graphically in FIG. 2, the deflection load of the foam pad changed substantially after the first 1,000 cycles and reduced somewhat more after 100,000 cycles. As further shown by the data set forth in Table 1, and graphically presented by FIG. 2, before application of the hexagonal roller, the load deflection testing indicates a break point at about 45 pounds of force. In certain embodiments, at this break point, a substantial number of cell windows may be ruptured and pneumatic contribution of the cells to the hardness measurement is decreased. At that point, there is a change in the linear rate of deflection. Thus, the data indicates that prior to application of the hexagonal roller, the firmness of the mattress pad is non-linear, providing one level of support for loads below 45 pounds and a second level of support for loads greater than 45 pounds. FIG. 2 shows that after testing for 1,000 cycles and the 100,000 cycles this non-linearity is removed and the support provided by the foam pad is linear from 20 pounds throughabout 100 pounds of force.

This data is further reflected in Table 1. In particular Table 1 shows in one example that for 1.5" of deflection an initial load of 57.7 pounds was required. After cycling through 1,000 cycles, the necessary load to achieve 1.5" of deflection was reduced by 16.5% to 48.2 pounds. As further shown, an additional 7.9% reduction occurred after 100,000 cycles wherein a force of 44 pounds was required to achieve 1.5" of deflection. At this point, after 100,000 cycles, the foam material required about 23% less force to achieve the 1.5" deflection. To this end, data measurements for other amounts of deflection are given in Table 1, as is the average, wherein it can be seen on average, after 1000 cycles the amount of force to achieve deflection was reduced by approximately 11.2% and after 100,000 cycles, was reduced by about 17%. As noted above, this result is understood to arise from a selected rupture of cell windows that provides an improved sleep surface that is more consistent.

In another set of experimental data, the results of which are set forth in Table 2, indentation load deflection (ILD) tests according to ASTM3574-05: Standard Test Methods for Flexible Cellular Materials—Slab, Bonded and Molded Urethane Foams were performed on P165-30-type foam to determine the effect of mechanical stress on the load deflection characteristics of the foam.

TABLE 2

| | No. of passes | | |
|---|---|---|---|
| | 1 | 3 | 9 |
| 25% | 25% ILD: 35.71 | | 25% ILD: 32.63 |
| | 65% ILD: 63.08 | | 65% ILD: 57.27 |
| | SF: 1.77 | | SF: 1.76 |

TABLE 2-continued

| | No. of passes | | |
|---|---|---|---|
| | 1 | 3 | 9 |
| 25%-65% | 25% ILD: 35.32 | | 25% ILD: 27.01 |
| | 65% ILD: 60.90 | | 65% ILD: 49.84 |
| | SF: 1.72 | | SF: 1.85 |
| 25%-65%-85% | 25% ILD: 34.12 | 25% ILD: 31.19 | 25% ILD: 26.49 |
| | 65% ILD: 58.87 | 65% ILD: 55.48 | 65% ILD: 46.59 |
| | SF: 1.73 | SF: 1.85 | SF: 1.76 |
| 65% | 25% ILD: 31.88 | 25% ILD: 30.46 | 25% ILD: 28.58 |
| | 65% ILD: 54.94 | 65% ILD: 56.48 | 65% ILD: 52.65 |
| | SF: 1.72 | SF: 1.85 | SF: 1.84 |
| 65%-85% | 25% ILD: 28.83 | 25% ILD: 28.64 | 25% ILD: 26.48 |
| | 65% ILD: 52.12 | 65% ILD: 50.79 | 65% ILD: 46.69 |
| | SF: 1.81 | SF: 1.77 | SF: 1.76 |
| 85% | 25% ILD: 33.51 | 25% ILD: 31.35 | 25% ILD: 27.15 |
| | 65% ILD: 59.27 | 65% ILD: 55.42 | 65% ILD: 50.30 |
| | SF: 1.77 | SF: 1.77 | SF: 1.85 |

In the data set forth in Table 2, a piece of P165-30 foam was subjected to a compression prestress treatment comprising at least one 4-Hz pass under one or more rollers set to compress the foam to a certain percentage ILD. The topmost row of Table 2 shows the number of passes that the foam underwent, and the leftmost column indicates the type of prestress treatment that was performed. For example, the "25%-65%-85%" row tabulates data from a piece of foam that was prestressed by compressing to 25% ILD, then to 65% ILD, and finally to 85% ILD. The "3" column of that row contains data from a piece of foam that was prestressed in this fashion three times; that is, three repetitions of the 25% ILD-65% ILD-85% ILD cycle. The initial characteristics of P165-30 foam are 37.86 at 25% ILD, 65.01 at 65% ILD, and 1.72 support factor. As is evident from the data in Table 2, prestressing decreases ILD at both 25% and 65%, and as the number of prestressing cycles increases, the more ILDs decrease. Furthermore, multi-step prestress treatments (e.g. 25%-65%, 25%-65%-85%, or 65%-85% treatments) decrease ILD more than single-step prestress treatments. As with the data tabulated in Table 1, these results are understood to arise from rupture of cell windows due to prestressing.

Figure 3:
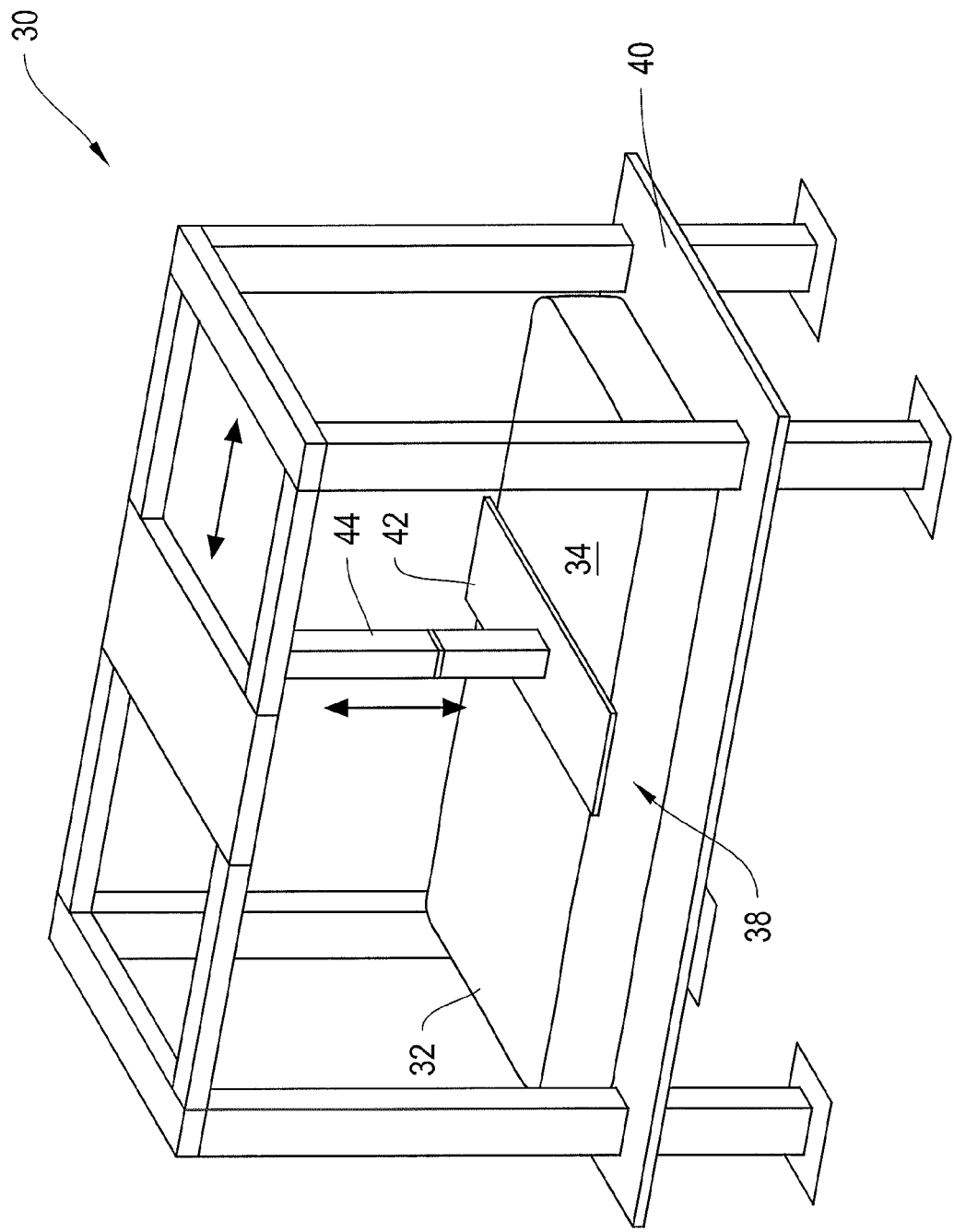
FIG. 3 depicts one embodiment of a system for processing a foam pad.

FIG. 3 depicts one embodiment of a system 30 capable of processing a foam pad 32 to provide a more consistent and uniform firmness or hardness across the surface 34 of the foam pad 32 and for its usable life as a mattress pad on a mattress. In particular, FIG. 3 shows a mattress being made with a foam pad 32 fitted on top of a mattress core 38. The mattress core 38 is seated on a table 40 above a moving platen 42. In certain embodiments, the table 40 may be perforated so that air being pushed out of the foam pad 32 during compression can escape through the table 40. The platen 42 is capable of moving back and forth from the foot of the mattress to the head of the mattress and at the same time, a mechanical arm 44 moves up and down as shown in FIG. 3. The mechanical arm 44 is capable of cyclically processing the foam pad 32 to apply a mechanical force. The amount of mechanical force applied is selected to adjust a mechanical characteristic such as the IFD of the foam pad 32. As shown in FIG. 3, the platen 42 carried on the mechanical arm 44 can move across the entire surface of the mattress, thereby processing the mattress across substantially its full length and width. This provides for a more consistent firmness across the full length and width of the mattress. In other embodiments, the foam pad may be first processed individually, without the mattress core, and then disposed on the mattress core to provide a conditioned mattress assembly.

In certain embodiments, the platen 42 is sized to be substantially similar to the sleeping area of the mattress and/or the foam pad. In such embodiments, the system 30 may be used to pre-condition a substantial portion of the mattress. Moreover, in such embodiments, the system 30 may be used to pre-condition the head, body and foot portions of the mattress surface simultaneously. In other embodiments, the system 30 may be configured as desired depending on the nature of the pre-conditioning. For example, the platen 42 may be sized and shaped to selectively pre-condition either a middle portion or edge portion or both of a mattress and/or foam pad. In another example, the system 30 may be configured with a plurality of platens 42 for pre-conditioning different portions of the mattress by applying similar or different loads. In certain embodiments, the platen 42 may be moveable along the length or width of the mattress and equipped with a cylindrical roller such that the platen 42 may roll along the surface of the mattress to progressively compress the mattress and/or the foam pad. Generally, in other embodiments and practices, it could be that the device shown in FIG. 3 merely processes selected portions and areas of the foam pad 32. In certain embodiments, the mattress may be posturized such that the mattress may be configured with a plurality of zones of varying firmness. In such embodiments, the mattress may be posturized with selected zones having different firmnesses from other zones to promote natural alignment of the S-curve of your spine by adding extra support in the lower back and under the knees or to provide varying firmness zones for partners that sleep on the same mattress but desire different firmness. It will be apparent to those with skill in the art that the areas processed on the foam pad 32 will depend on the application and can vary as desired. In certain embodiments, more foam pads (not shown) may be further disposed on the mattress to provide multiple layers of foam. Optionally, one or more of these additional foam pads may also be pre-conditioned by stressing, compression, and/or stretching as described in this application, to provide a mattress with multiple layers of pre-conditioned foam.

Figure 4:
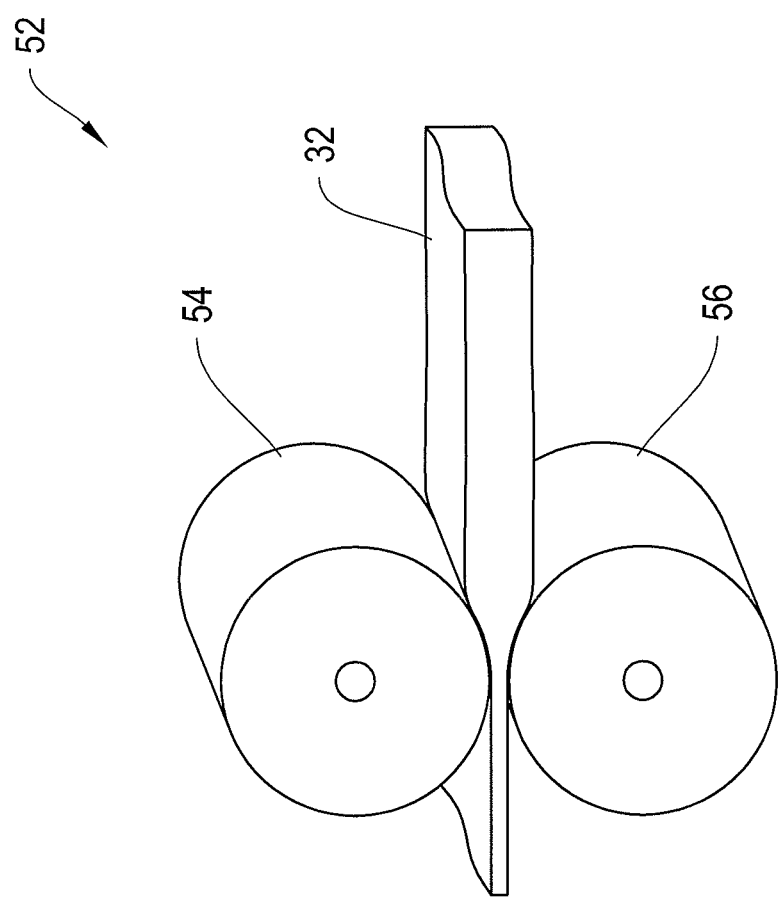
FIG. 4 depicts an alternate embodiment of a system for processing a foam pad.

FIG. 4 depicts an alternate system for processing a foam pad. In the depicted embodiment a pair of counter-rotating rollers apply a force across the full length and width of the foam pad. The rollers can optionally be placed into the foam manufacturing, cutting or shipping assembly line so that newly manufactured foam is processed as it is being prepared in the factory. In still a further embodiment and practice, the foam pad may be subjected to a vacuum crushing process that uses the force of a vacuum to alter the selected mechanical property. As known to those of skill in the art, vacuum processing may be achieved by placing newly manufactured foam into a chamber. The chamber can support a vacuum and the foam inside the chamber is subjected to the force of the vacuum, causing the foam to be crushed in a process that causes the rapid expansion of the foam within the chamber. In the presence of the vacuum, the gas inside the foam cells may cause the foam to expand and when the vacuum is dropped, the foam may return to its original shape and rupture intact cell windows along the way. In other embodiments, the foam pad may processed using gas pressure instead of vacuum. In this embodiment, the foam pad may be placed into a chamber that can support high gas pressure. The chamber is pressurized to a high gas pressure, which causes the foam to be crushed and foam cell walls to be ruptured. Still other techniques and combination of techniques may be used with the systems and methods described herein without departing from the scope of the invention.

Figure 5:
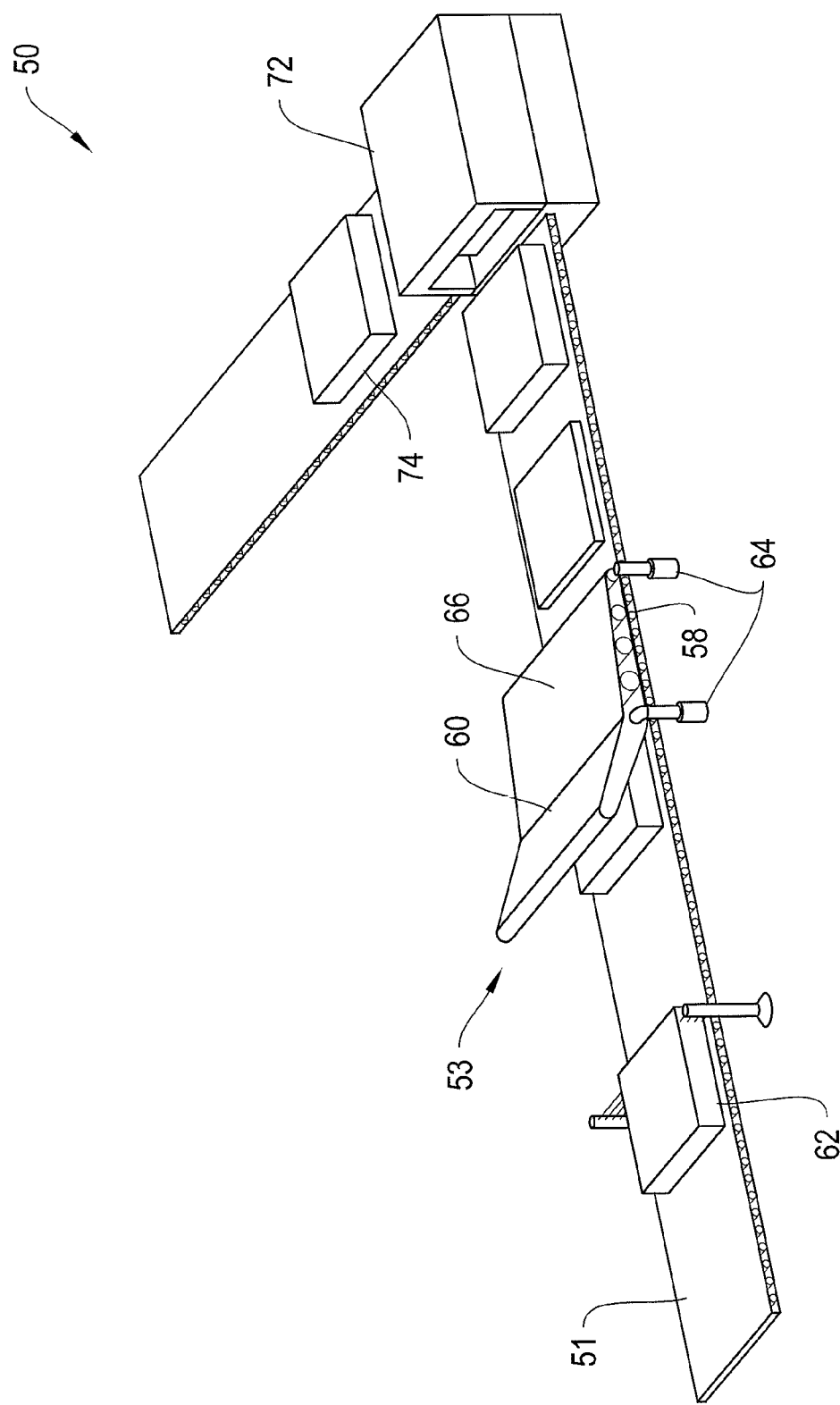
FIG. 5 depicts a system for processing a mattress prior to packaging, according to an illustrative embodiment of the invention.

FIG. 5 depicts a system 50 for processing a mattress prior to packaging, according to an illustrative embodiment of the invention. In particular, system 50 includes a mattress 62 placed on a conveyor 51. The mattress may be a finished mattress 50 product having a mattress core and/or one or more layers including one or more of a ticking layer, foam pad, backing layer and fire retardant layer. The system 50 further includes a compression assembly 53. The assembly 53 includes a platen surface 66 and one or more rollers 58 mounted on legs 64. The system 50 also includes a packaging apparatus 72 for packaging or bagging the pre-conditioned mattress product. The system 50 may further include one or more sensors, such as a height sensor, disposed at various location's along the conveyor 51. During operation, the mattress 62 moves along the conveyor 51 and towards the compression assembly 53. The mattress 62 may undergo one or more discrete or continuous compressions at the compression assembly 53. In one embodiment, the platen 66 bends along hinge 60 to first compress the mattress 62. The platen 66 may also be disposed at an angle with the conveyor 51 such that the distance between the conveyor 51 and the platen 66 decreases along the length of the conveyor 51. Systems 30 and 52 described with reference to FIGS. 3 and 4, respectively may also be used in combination with system 50. Following compression, the mattress 62 may be allowed to decompress and recover. Upon recovery, the mattress 62 may be packaged at the packaging apparatus 72.

Figure 6:
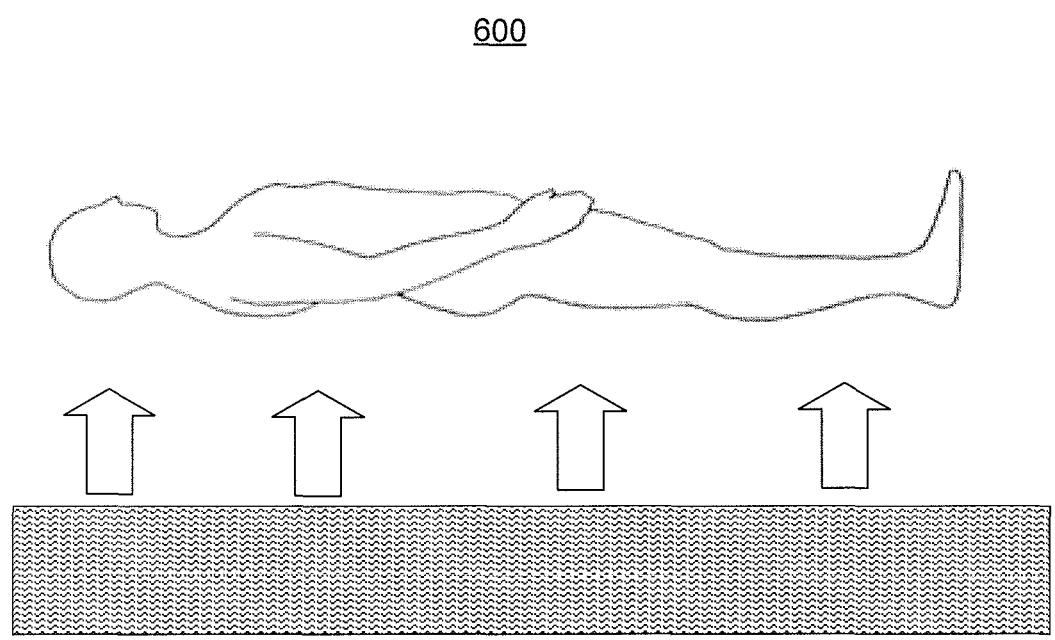
FIG. 6 depicts possible pressure points for a person lying down on a mattress.

FIG. 6 depicts a diagram of a person lying down on a mattress. When a person lies on a flat, noncompliant surface, his or her entire weight is generally primarily supported by several points of contact with the surface. For example, a person lying on his or her back on a flat surface may be primarily supported by his or her head, shoulders, buttocks, and calves. These portions of the body may experience higher pressures due to this contact, and after prolonged contact, this may result in discomfort. If the surface is a mattress or a cushioning article, these pressures are moderated somewhat due to the compliant nature of the mattress or cushioning article. However, even in this case, textural or firmness adjustments made to the mattress or cushioning article at these points of contact may help alleviate discomfort. Such a mattress is known as a posturized mattress.

Figure 7:
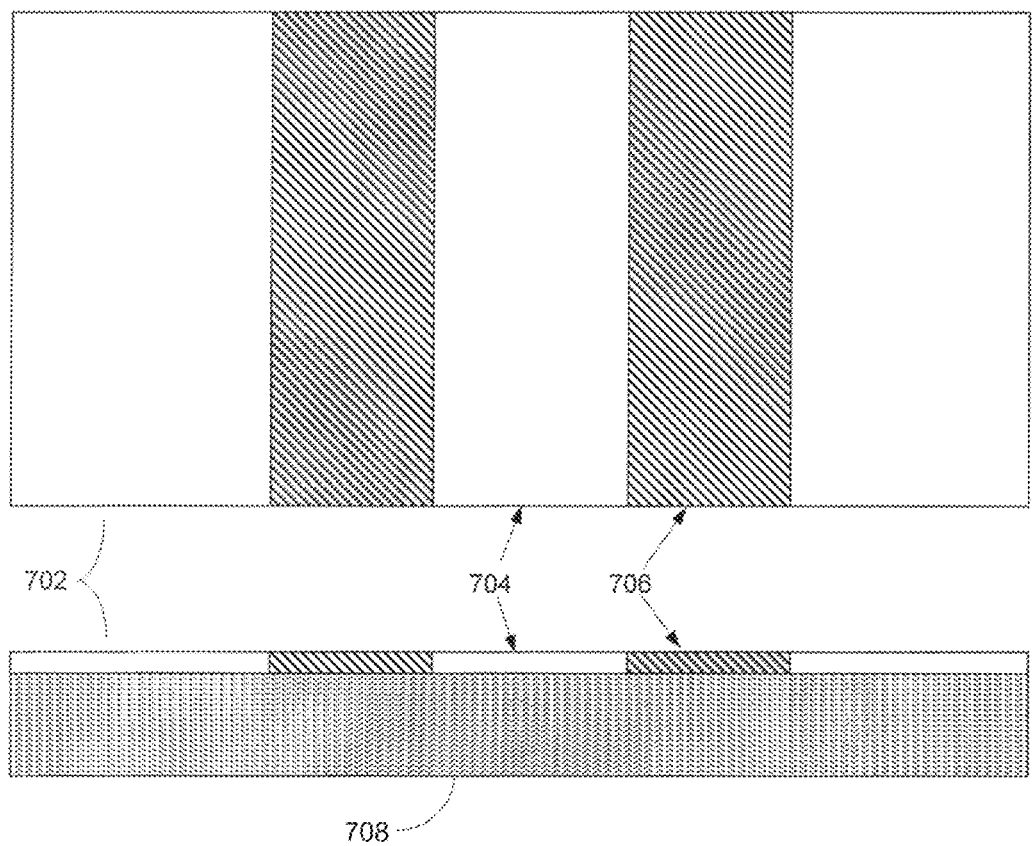
FIG. 7 depicts a posturized mattress, according to illustrative embodiments of the invention.

FIG. 7 depicts a top-down view (top) and a side view (bottom) of a posturized mattress 700 according to an embodiment of the invention. Posturized mattress 700 includes a mattress core 708 and a posturized foam pad 702 disposed upon the mattress core 708 to provide a sleeping surface. Portions 704 and 706 of the foam pad 702 may be processed differently. For example, portion 706 of the foam pad 702 may be pre-stressed, whereas portion 704 is not pre-stressed. This results in a posturized mattress where certain portions of the mattress are firmer or softer, and may be tailored to match a user's sleeping posture. In other embodiments, different portions of the foam pad or mattress may be pre-stressed to different extents. For example, one section of the mattress and/or foam pad may be compressed (or stretched) a certain amount to provide a particular firmness, and another section of the same mattress and/or foam pad may be compressed or stretched by a different amount to provide a different firmness. Optionally, a mattress and/or foam pad may be pre-stressed in more than two portions, and each portion may be pre-stressed to provide a different firmness. In certain embodiments, the mattress core 708 may also be posturized.

Figure 8:
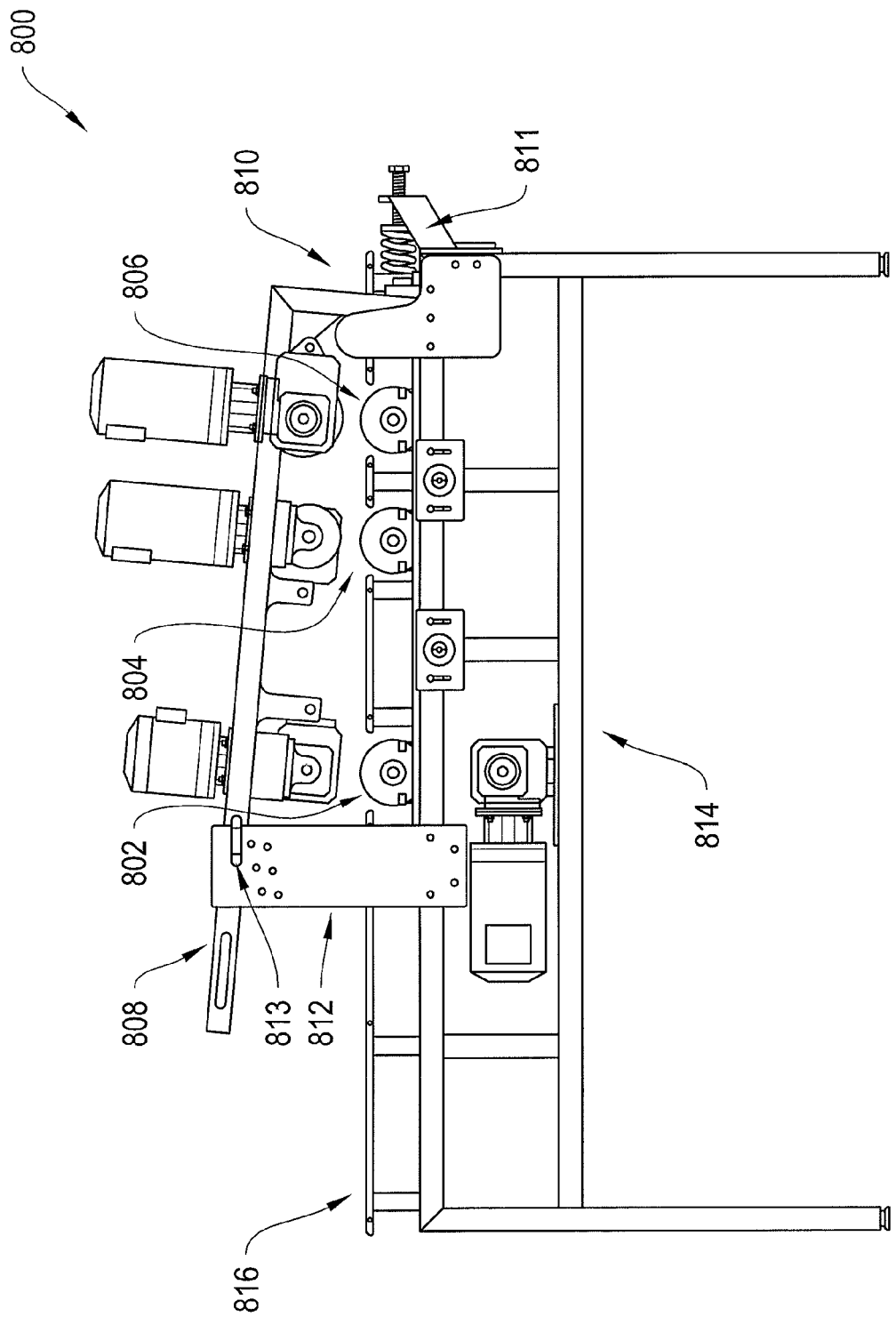
FIG. 8 depicts one embodiment of a pre-conditioner apparatus for pre-stressing mattresses or foam cushioning articles.
Figure 9A:
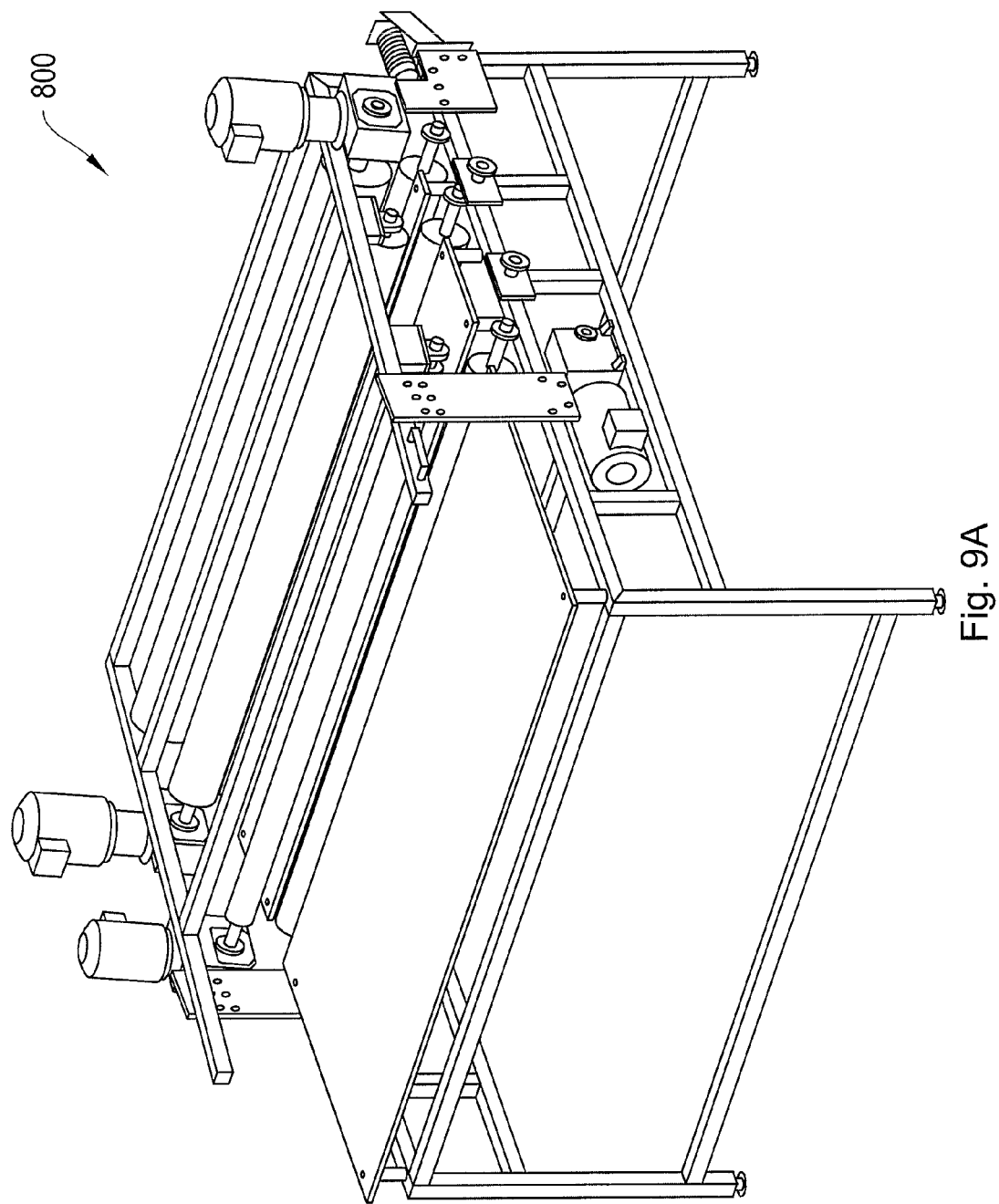
FIGS. 9a-9d depict the apparatus of FIG. 8 from various perspectives.
Figure 9B:
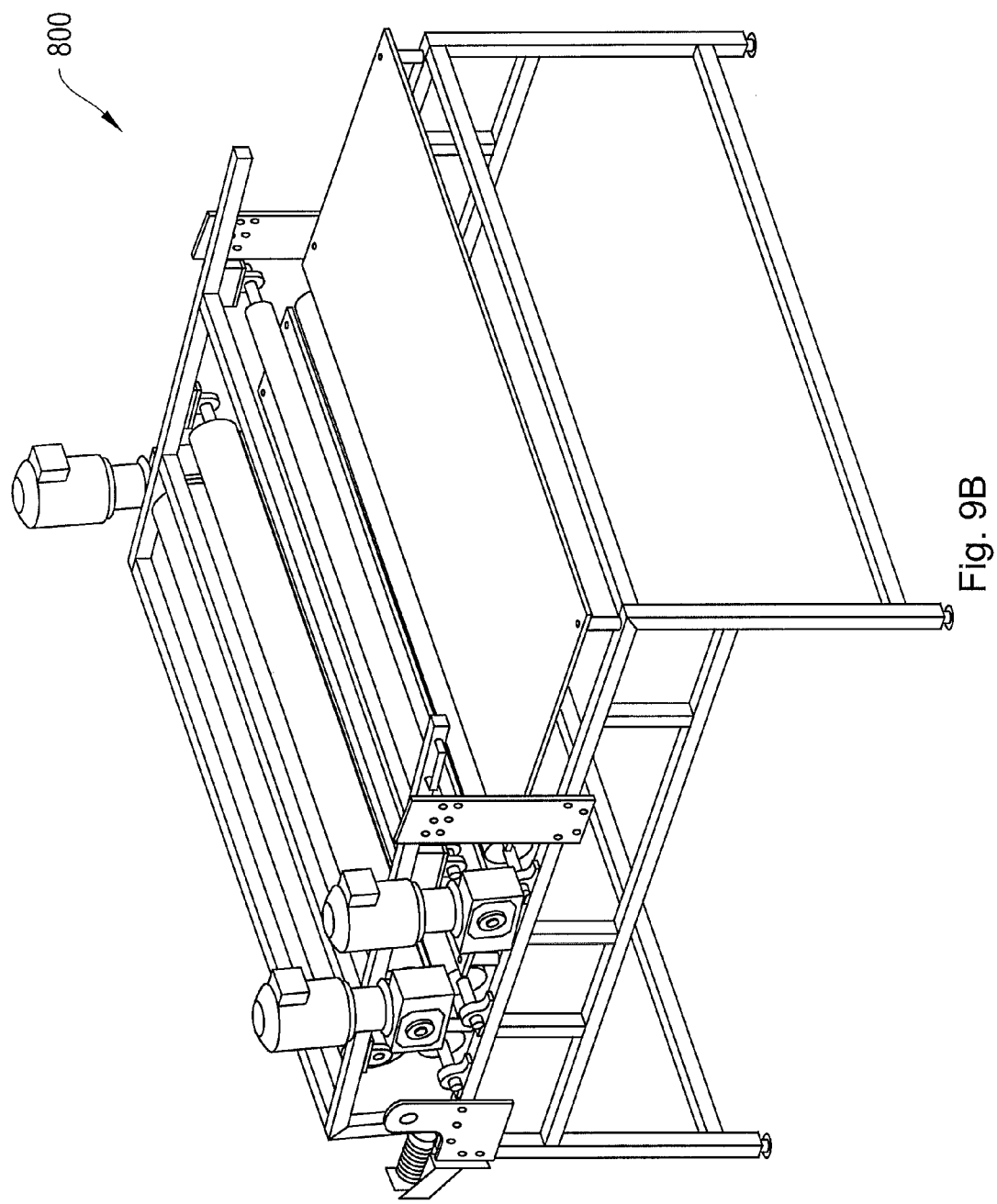
Figure 9C:
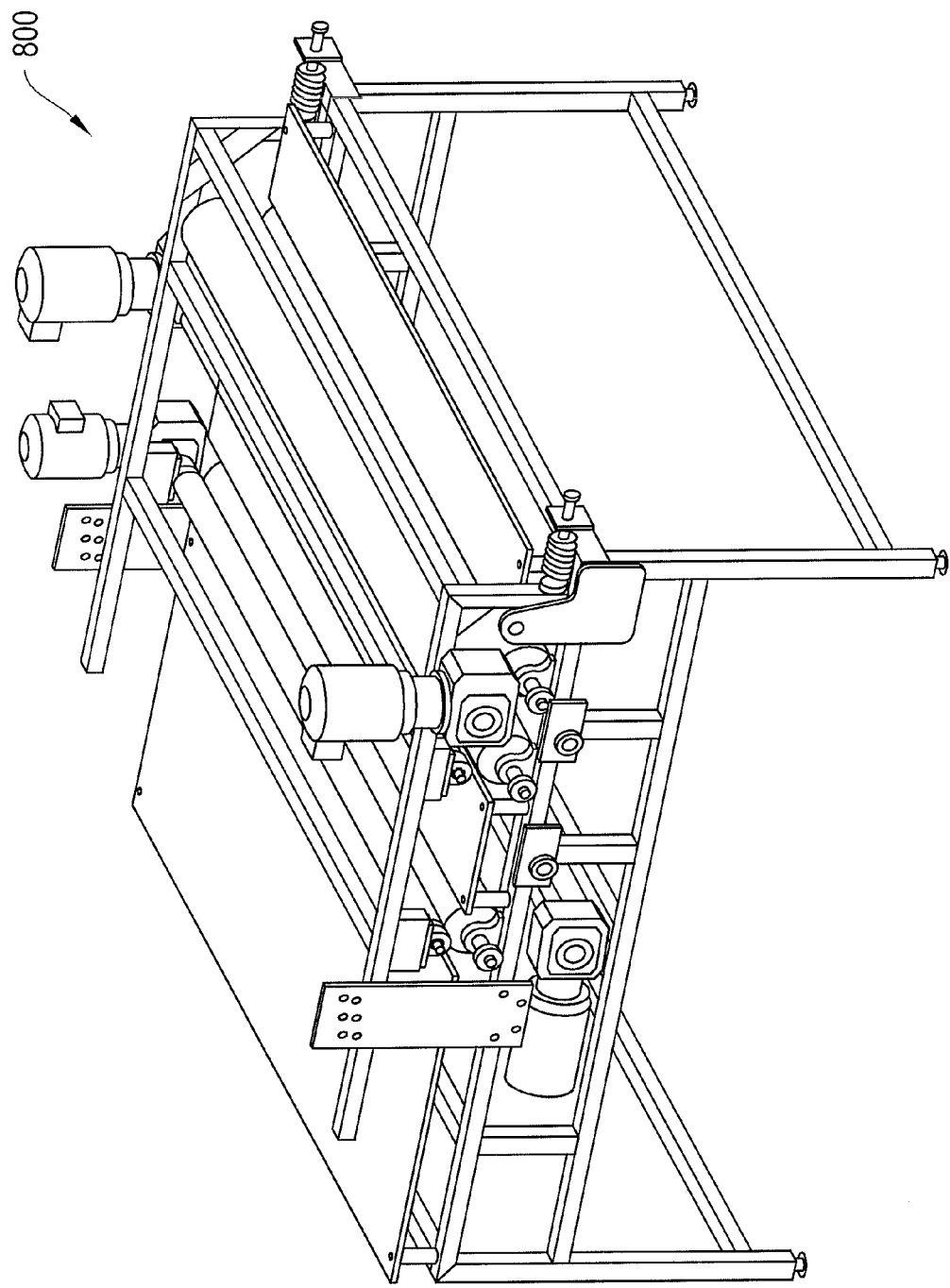
Figure 9D:
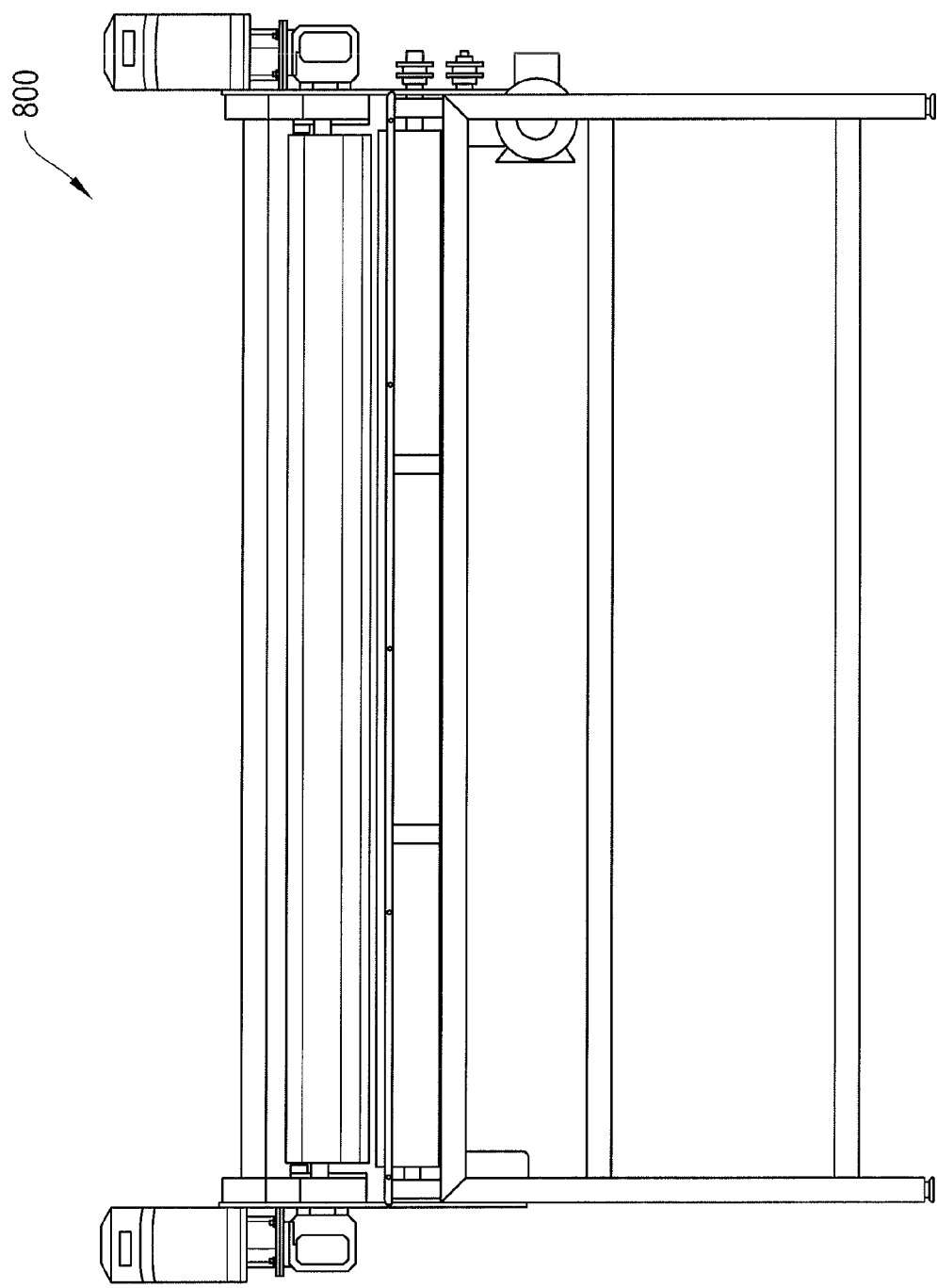

FIG. 8 depicts an exemplary pre-conditioner apparatus 800 for pre-stressing mattresses and foam cushioning articles. Exemplary pre-conditioner apparatus 800 includes three pairs of counter-rotating rollers 802, 804, and 806, but it should be understood that the number of rollers or pairs of counter-rotating rollers may be varied without departing from the scope of the invention. The roller pairs 802, 804, and 806 may be disposed such that the roller pairs are substantially parallel to each other, and oriented so that a mattress, foam pad, or other item that passes through one roller pair during the normal course of operation will also pass through the other roller pairs. One roller from each pair of rollers 802, 804, and 806 may be rotationally coupled to a first support frame 808. The other roller from each pair of rollers 802, 804, and 806 may be rotationally coupled to a second support frame 814. In certain embodiments, the rollers from roller pairs 802, 804, and 806 coupled to the first support frame 808 may instead be rotationally coupled to one or more roller drivers or mounts, which may be in turn coupled to first support frame 808. Likewise, the rollers from roller pairs 802, 804, and 806 coupled to the second support frame 814 may instead be rotationally coupled to one or more roller drivers or mounts, which may be in turn coupled to second support frame 814. One or more rollers in each roller pair may be allowed to rotate freely. Alternatively, one or more rollers in each roller pair may be actuated by a motor or some other actuation device. In certain embodiments, the one or more rollers coupled to either the first or second support frames may have degrees of freedom in the vertical and/or horizontal or machine direction. In these embodiments, the one or more rollers may be adjustable in a vertical direction, so that roller pair gap spacing can be changed or the entire roller pair can be shifted vertically up or down with respect to the support frames and/or the entire apparatus. Optionally, the one or more rollers may be adjustable in a horizontal or machine direction, such that the horizontal spacing between roller pairs can be adjusted. In certain embodiments, the horizontal positioning of the individual rollers within a roller pair may be adjusted independently, such that one of the rollers may be shifted horizontally without a corresponding shift in the other roller, or both rollers may be shifted in opposite directions.

In certain embodiments, first and second support frames 808 and 814 may be physically linked to each other by hinges 810 and spacers 812. Support springs 811 may apply a force to a portion of first support frame 808 to maintain a particular separation between the counter-rotating rollers in each of roller pairs 802, 804, and 806. Spacers 812 may hold one or more positioning markers 813, which may aid in maintaining the separation between the counter-rotating rollers in each roller pair. In certain embodiments, positioning markers 813 constrain the vertical movement of first support frame 808. Optionally, positioning markers 813 may assist in supporting first support frame 808 so as to maintain a particular roller separation.

Spacers 812 may be configured to hold positioning markers 813 in a plurality of positions, with each position corresponding to a desired roller-roller spacing within a particular roller pair. The force exerted on first support frame 808 by springs 811 may enable efficient and quick readjustment of roller-roller spacing within the roller pairs 802, 804, and 806. The roller-roller spacing within each roller pair may be adjustable by a number of methods. For example, the roller-roller spacing of all the roller pairs may be adjusted simultaneously by changing the position of positioning markers 813 on spacers 812. Optionally, the roller-roller spacing of individual roller pairs may be adjusted by moving the individual rollers rotationally coupled to first support frame 808 vertically up or down. Roller-roller spacing may be set in order to compress a mattress or foam pad by a certain amount or to exert a certain force on the mattress or foam pad. In certain embodiments, the rollers in roller pair 802 may be separated by a gap of about 2 inches, the rollers in roller pair 804 may be separated by a gap of about 1 inch, and the rollers in roller pair 806 may be separated by a gap of about 0.5 inches.

Platform 816 may be attached to second support frame 814. In this exemplary embodiment, platform 816 is a stationary platform on which a mattress or foam pad being processed may rest. In certain embodiments, platform 816 may be replaced by a multi-roller system or a conveyor belt to more easily transport mattresses or foam pads being processed.

The rollers in roller pairs 802, 804, and 806 may rotate such that their tangential velocities are substantially similar. In certain embodiments, the rollers in a particular roller pair may rotate such that their tangential velocities differ from those of the rollers in another roller pair. For example, the rollers in roller pair 804 may operate with lower tangential velocities than the rollers in roller pair 806. Thus, a mattress or foam pad being processed may not only be compressed by roller pairs 802, 804, and 806, it may also be stretched in a longitudinal direction due to the differing tangential velocities of roller pairs 804 and 806. Similarly, roller pairs may operate with differing tangential velocities in order to compress a mattress or foam pad in a longitudinal direction. In certain embodiments, the differing tangential velocities may be selected to stretch a mattress or foam pad with an initial length and width by an additional length and/or width chosen to provide a particular final mattress/foam pad firmness.

FIGS. 9*a*-*d* depict the exemplary apparatus of FIG. 8 from a number of different perspective views.

Figure 10A:
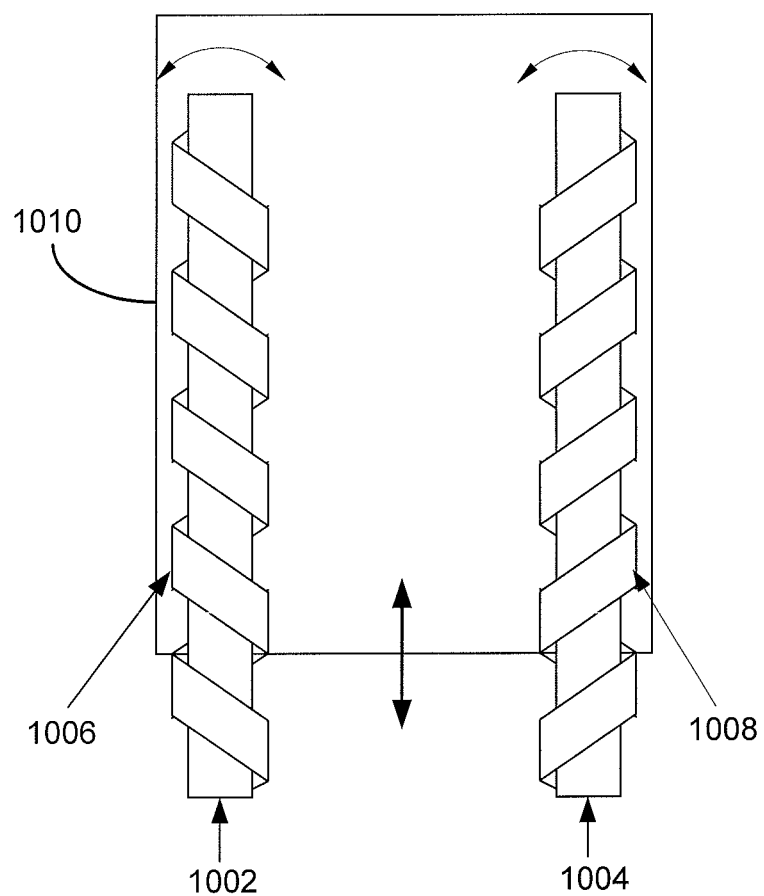
FIGS. 10a and 10b depict an alternate embodiment of a system for pre-stressing mattresses or foam cushioning articles.
Figure 10B:
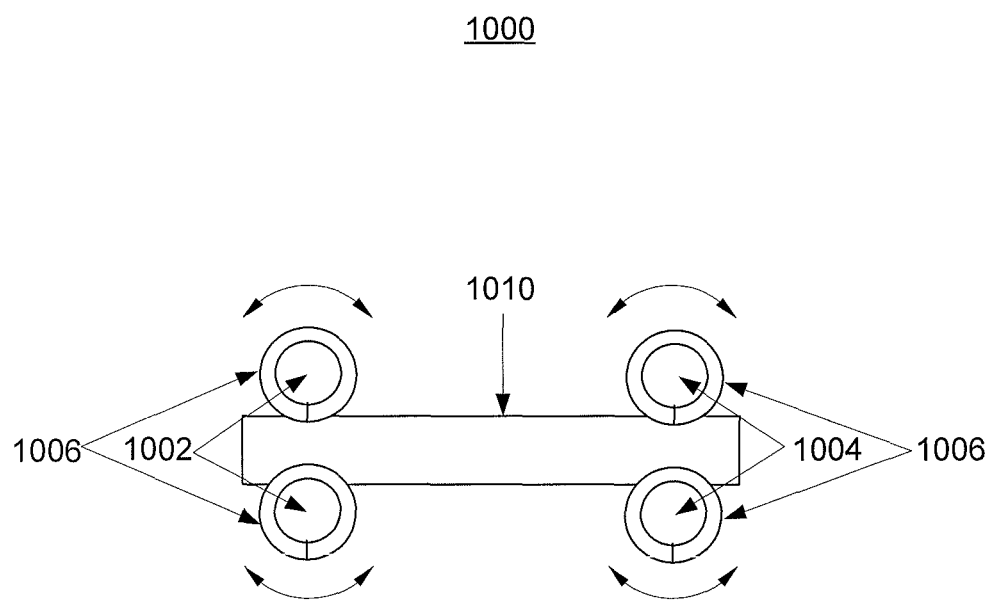

FIGS. 10*a*-*b* depict an optional implementation 1000 of a mattress pre-stressing apparatus according to the invention. FIG. 10*a* is a view of optional implementation 1000 from above, and FIG. 10*b* is a view of optional implementation 1000 from one side. Implementation 1000 comprises at least two counter-rotating roller pairs 1002 and 1004. Roller pairs 1002 and 1004 may include spiral features 1006 and 1008 which extend from each of the rollers of roller pairs 1002 and 1004. When a mattress or foam pad 1010 is being processed, roller pairs 1002 and 1004 rotate so as to pull mattress or foam pad 1010 to their respective sides. For example, roller pair 1002 may rotate so as to pull mattress 1010 toward the left side, and roller pair 1004 may rotate so as to pull mattress 1010 toward the right side. The spiral features 1006 and 1008 may act to pull the mattress along a direction parallel to the roller pairs, as indicated by the straight, double-ended arrow in FIG. 10*a*. Thus, a mattress or foam pad 1010 may be transported in a longitudinal direction (straight double-ended arrow) while being stretched in a substantially transverse direction (perpendicular to straight double-ended arrow).

Figure 11:
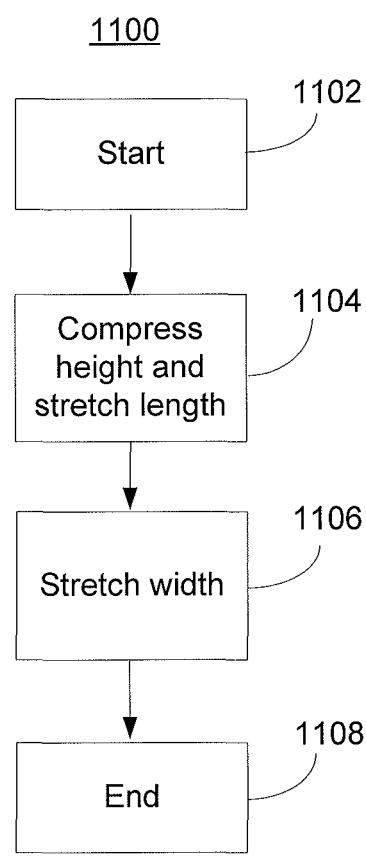
FIG. 11 is a flowchart of an exemplary pre-stressing process for mattresses or foam cushioning articles.

FIG. 11 is a flowchart of an exemplary pre-stressing process 1100 according to the invention. After the start of the process (step 1102), a mattress or foam pad being processed in the exemplary apparatus of FIG. 8 may be compressed vertically by roller pairs 802, 804, and 806 (step 1104). Optionally, the mattress or foam pad may also be simultaneously stretched in a direction perpendicular to the roller pairs by roller pairs 802, 804, and 806 (step 1104). After the initial compression and optional stretching, the mattress or foam pad may undergo a further stretching in a direction perpendicular to the initial optional stretching in the exemplary apparatus of FIG. 10, by roller pairs 1002 and 1004 (step 1106). Finally, the process may end at step 1108, and may repeat. In certain embodiments, step 1106 may occur before step 1104, or even occur simultaneously. In all of the above embodiments, the stressing, compression, and/or stretching of the mattress or foam pad may be temporary, in that the stressing, compressing, and/or stretching force is only applied for a finite period of time, and after the force is no longer applied, the mattress and/or foam pad dimensions remain substantially similar to the pre-stressed/compressed/stretched dimensions.

Those skilled in the art will know or be able to ascertain using no more than routine experimentation, many equivalents to the embodiments and practices described herein. For example, the illustrative embodiments discuss mattresses, but other cushions and furniture may be made with the systems and methods described herein. As another example, it should be understood that compressing, stressing or stretching a foam pad in one or more axial directions such that cell windows are broken may be covered by different embodiments of the present invention. Accordingly, it will be understood that the invention is not to be limited to the embodiments disclosed herein, but is to be understood from the following claims, which are to be interpreted as broadly as allowed under the law.

Variations, modifications, and other implementations of what is described may be employed without departing from the spirit and scope of the invention. More specifically, any of the method, system and device features described above or incorporated by reference may be combined with any other suitable method, system or device features disclosed herein or incorporated by reference, and is within the scope of the contemplated inventions. The systems and methods may be embodied in other specific forms without departing from the spirit or essential characteristics thereof. The foregoing embodiments are therefore to be considered in all respects illustrative, rather than limiting of the invention. The teachings of all references cited herein are hereby incorporated by reference in their entirety.

The invention claimed is:

1. A system for pre-conditioning cushioning articles, comprising
    at least a first pair of rollers including a first roller and a second roller;
    a first support frame and a second support frame;
    a spacer comprising positioning markers, the spacer coupled to a free end of the first support frame and configured to support the first support frame at a defined distance from the second support frame; and
    a hinge system including at least one support spring, wherein
        the first roller is separated from the second roller by a first gap;
        the first roller is rotationally coupled to the first support frame and the second roller is rotationally coupled to the second support frame, wherein at least one of the first and second rollers is coupled to a roller driver for movably translating the cushioning article during operation thereof;
        the hinge system is adjustably coupled to the first support frame and the second support frame, the hinge system comprising a hinge coupling an end of the first support frame to the second support frame to form a hinged end such that the free end of the first support frame can be moved relative to the second support frame;
        the at least one support spring is attached to the first support frame at the hinged end and configured to exert a first force on the first support frame sufficient to maintain the first gap, wherein the at least one support spring is a compression spring, wherein the compression spring is configured to increase the first gap between the first and second rollers by increasing compression and decrease the first gap by decreasing compression; and
        the first gap changes in response to adjustments in the hinge system.

2. The system of claim 1, further comprising at least one freely rotating coupling, wherein at least one of the first roller and the second roller is rotationally coupled to the first or second support frame via the at least one freely rotating coupling.

3. The system of claim 1, further comprising at least one roller driver coupling, wherein at least one of the first roller and the second roller is rotationally coupled to the first or second support frame via the at least one roller driver coupling.

4. The system of claim 3, further comprising at least one motor assembly, wherein at least one of the first roller and the second roller is rotationally coupled to and actuatable by the motor assembly.

5. The system of claim 1, further comprising a second pair of rollers, wherein
    the first pair of rollers and the second pair of rollers are arranged in a series configuration and with degrees of freedom in both the vertical and machine direction regarding set points,
    the first roller is a first top roller and the second roller is a first bottom roller,
    the first support frame is a top support frame and the second support frame is a bottom support frame,
    the second pair of rollers includes a second top roller, rotationally coupled to the top support frame, and a second bottom roller, rotationally coupled to the bottom support frame, and separated from each other by a second gap different from the first gap,
    the first force is sufficient to maintain the second gap; and
    the second gap changes in response to adjustments in the hinge system.

6. The system of claim 5, further comprising a third pair of rollers, wherein
    the third pair of rollers includes a third top roller, rotationally coupled to the top support frame, and a third bottom roller, rotationally coupled to the bottom support frame, and separated from each other by a third gap different from the first gap and the second gap,
    the first force is sufficient to maintain the third gap; and
    the third gap changes in response to adjustments in the hinge system.

7. The system of claim 6, wherein the first pair of rollers, second pair of rollers and third pair of rollers are arranged in a series configuration and with degrees of freedom in both the vertical and machine direction regarding set points.

8. The system of claim 6, wherein the first gap is about 2 inches, the second gap is about 1 inch, and the third gap is about 0.5 inches.

9. A system for pre-conditioning cushioning articles, comprising
- at least a first pair of rollers including a first roller and a second roller, wherein a selected one of the first and second rollers is rotationally coupled to a roller driver and the other one is freely rotatable;
- a first support frame and a second support frame;
- a spacer comprising positioning markers, the spacer coupled to a free end of the first support frame and configured to support the first support frame at a defined distance from the second support frame; and
- a hinge system including at least one support spring, wherein the first roller is separated from the second roller by a first gap and is rotationally coupled to the first support frame and the second roller is rotationally coupled to the second support frame, wherein the hinge system is adjustably coupled to the first support frame and the second support frame, wherein the at least one support spring is attached to the first support frame at the hinged end and configured to exert a first force on the first support frame sufficient to maintain the first gap, wherein the first gap changes in response to adjustments in the hinge system, wherein the at least one support spring is a compression spring configured to increase the first gap between the first and second rollers by increasing compression and decrease the first gap by decreasing compression, and wherein the selected one of the first and second rollers rotationally coupled to the roller driver movably translates the cushioning article during operation thereof.

* * * * *